Jan. 16, 1945.  H. L. THIELE  2,367,448
FOOD FRYING UNIT
Filed Nov. 29, 1943
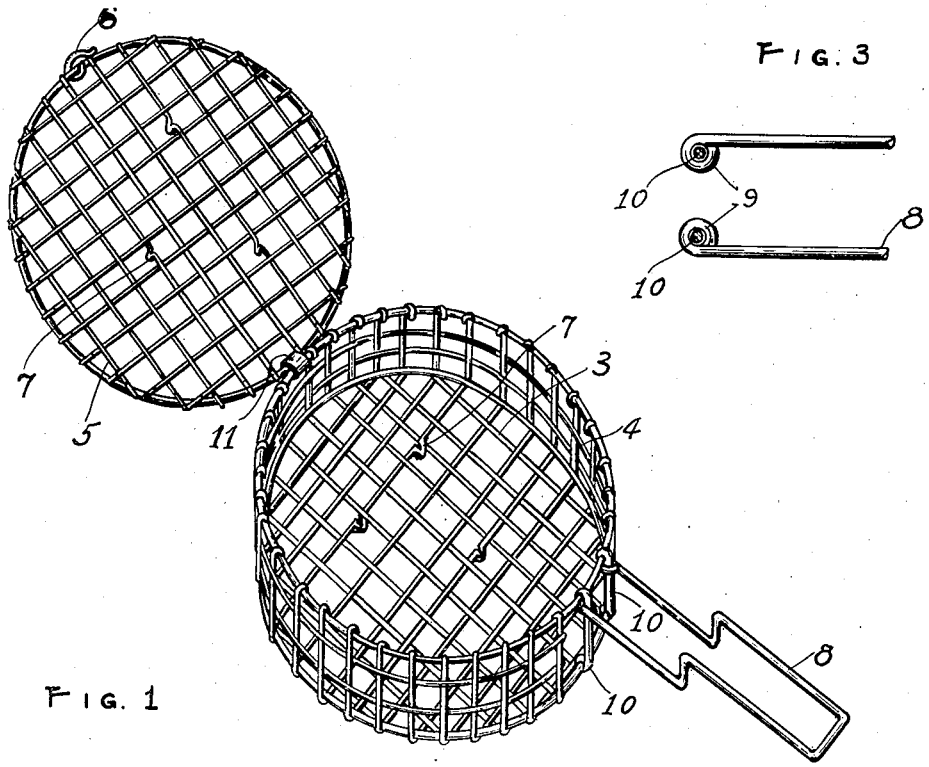
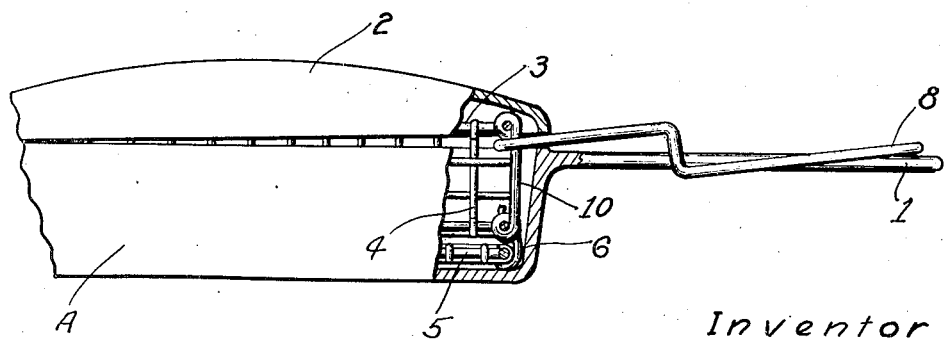
Inventor
HAZEL L. THIELE
By:- Ben V. Zillman
Attorney Patented Jan. 16, 1945

2,367,448

UNITED STATES PATENT OFFICE 2,367,448

FOOD FRYING UNIT

Hazel L. Thiele, St. Louis, Mo.

Application November 29, 1943, Serial No. 512,183

6 Claims. (Cl. 99—409)

The invention relates generally to food frying units, but more particularly to a cage or basket in which food is received, and the filled unit then placed within a frying pan or other culinary receptacle for the required extent of frying.

One of the principal objects of my invention is to so construct a device of the kind described, that the entire unit may be easily reversed and re-inserted into the frying receptacle when the under side of the food has been sufficiently fried, and without the necessity of using a spoon, fork or other instrument for this purpose.

Another object of this invention is to so construct a frying unit of the kind described, that the control handle for manipulating the unit in reversing the same or otherwise moving it, is slidably connected to said unit and whereby this handle is thereby shiftable to be brought to uppermost position, regardless of reversed position of the fry unit at any time.

A still further object of my invention is to so construct a device of the kind described, that a lid of usual construction may be placed on the receptacle wherein the frying unit has been placed, with practically no interference of the operation and function of said lid.

An added object of my invention is to so construct a device of the kind described, that the ordinary relatively shallow frying utensils to be found in most kitchens, may be used for frying meats, fowl, fish, and practically any other foodstuffs often fried in deep fat, not only saving fat, but time, and all with less handling of the pieces or particles of the food being fried, and with less breaking of such food and sticking of the same to the pan.

The invention has among its other objects the construction of a device of the kind described that will be neat attractive in appearance, extremely simple to construct and use, of relatively low cost, having little or nothing to get out of order and thereby serviceable over long periods, which will enable the user to fry foods in shallow fat with less trouble, less waste, faster and better than previously, and which shall be otherwise satisfactory and efficient for use wherever deemed applicable.

Many added objects and advantages of the construction herein shown and described, and the uses mentioned, will be obvious to those skilled in the art to which this invention appertains, as will be apparent from the disclosures herein given.

To this end, my invention consists in the novel construction, arrangement and combination of parts herein shown and described, and the uses mentioned, as will be more clearly pointed out in the following specification.

In the drawing, wherein like reference characters indicate like or corresponding parts throughout the views, Figure 1 is a perspective view of the device, opened for receiving the articles to be fried;

Figure 2 is a side elevation of the same, reversed and latched, within a skillet shown partially in section; and Figure 3 is a fragmentary detail showing the slidable connection between the handle and side wall of the unit.

Referring more particularly to the drawing, wherein I have illustrated a preferred embodiment of my invention, A indicates a frying pan or skillet, or other relatively shallow culinary receptacle commonly used for frying, this receptacle usually having the handle 1 projecting therefrom and by which the same may be manipulated and moved. A lid 2, of a size to seat on the top edge of the pan A may be associated with the latter, in the usual manner.

Such pans are customarily employed for shallow frying, and when foods are fried therein, much watching and care must be given, so as to prevent burning, and sticking of the food to the pan, and breaking of food on account of such handling.

To overcome these objections to frying in such utensils, and with all of the advantages of deep frying, I have invented an accessory to fit within such utensils and wherein the frying will take place, and as will now be described.

A basket, preferably of foraminous material, such as wire mesh, for example, is formed with a bottom wall 3 and a bounding or peripheral wall 4, the top of the basket being open thereacross, as shown, so that the piece or portions of food may be readily received within said basket. The basket is preferably of such a size and shape that it will readily seat within the fry pan or other receptacle intended to be used for the purpose, and of such height as to extend to substantially the top edge of the said utensil A.

A cover or closure 5 of a size to fit across the open top of the basket, and similarly made of foraminous material, is movably connected to the basket, as by the hinge 11 at one side of the cover. In order to releasably latch or lock the cover in place on the basket, and permit handling and reversing of the entire unit without danger of displacement of the contents, any suitable form of interlock 6 may be positioned at a point substantially diametrically opposed to the hinge 11, somewhat as shown. The basket and its cover thereby form a unit, wherein foodstuffs may be held during the time that the unit is positioned in said utensil A, and the same can be handled safely without danger of loss of the contents. If desired, lugs 7 may be provided to project outwardly of the basket and cover unit, and which form rests engageable with the bottom of the utensil A for supporting the said unit thereon, in both reversed positions.

In order to enable the unit to be carried to or from the stove upon which has been placed the heated utensil A, and for manipulation of the said unit whenever deemed necessary, and as will be hereinafter more clearly described, a handle 8 has been mounted on the basket of the fry unit. This handle projects transversely of the basket so that its outer end is spaced from the direct flame of the stove, and it is to be especially noted that the handle is bodily movable up and down relatively of the basket. To attain this relationship, the inner ends of said handle may be looped as at 9, with each of said loops slidably encircling an upright wire 10 of the side or bounding wall of said basket, so that there is nothing to interrupt the free sliding movement of the handle, from top to bottom of said basket.

Through the provision of such sliding connection between the handle 8 and the basket unit, it is seen that the handle may be shifted to its topmost position regardless of whether or not the basket bottom or the cover is uppermost at the time. The handle 8 will not interfere with the normal function and positioning of the skillet lid 2 to any material degree, because, as is shown in the drawing, said lid 2 may be positioned in its usual manner, on the fry pan, even when the fry unit is in place within the pan, the handle 8 of said fry unit extending transversely outwardly and preferably with its outer end resting on the handle 1 of the fry pan A.

In using my improved device, the articles desired to be fried are placed within the fry unit and its cover closed and latched to prevent accidental spilling of said contents. The filled unit is then lowered into the skillet A, into which a small amount of fat or the like has been heated to the degree desired. The unit thus rests on the skillet bottom, but with the food out of direct contact with said bottom, so as to avoid burning and sticking and the like, the handle 8 of said fry unit in topmost position and with its outermost end resting on the skillet handle, somewhat as shown. The lid 2 may be placed upon the skillet, or not, as desired, and as the need arises.

Now, when the food has been fried sufficiently on its under side, the fry unit is lifted from said skillet by means of its handle 8, and rotated as an entirety about its horizontal axis, or reversed from its original position, and then reinserted into the skillet and left therein until the newly presented side of the food has been sufficiently fried. At the second or reversed position of said unit, the handle 8 will have been brought practically automatically to its topmost position, sliding upwardly relatively to the basket, this movement being aided due to the weight of the filled basket, and when the handle is released after the unit has been reversed, said handle will then be in its uppermost position again and have its outer end again resting on the skillet handle.

With a unit of the kind just described, there will be no danger of the contents spilling during manipulation of the unit, inasmuch as the cover of said unit is firmly held in latched engagement with the basket. Obviously, there is a minimum of handling of said food during frying, and consequently none of the exterior portions of the same will burn, stick, or be otherwise damaged in taste or appearance, and with soft foods especially there will be no breakage of food.

Having thus described my invention, it is obvious that various immaterial changes may be made in the same without departing from the spirit of my invention; hence I do not wish to be understood as limiting myself to the exact form, arrangement, construction and combination of parts shown and described, or the uses mentioned, except as limited by the state of the art to which this invention appertains, and the claims hereunto appended.

What I claim as new and desire to secure by Letters Patent is:

1. A device of the kind comprising a reversible food-receiving foraminous basket, and a basket-reversing handle movably attached to said basket and shiftable bodily toward the top of the latter at each reversal of the basket to change said point of attachment to the basket.

2. A food-receiving device for removable insertion into a fry utensil and comprising a perforated receptacle of a size to fit within the latter, and a handle projecting from said receptacle, whereby said receptacle may be reversed about a horizontal axis, said handle being movable substantially vertically of said receptacle.

3. A food-receiving unit for removable insertion into a fry utensil and comprising a basket and cover of foraminous material of a size to fit within said utensil, and a control handle connected to said unit whereby the latter may be reversed about a horizontal axis for re-insertion into the utensil, said handle being movable substantially vertically on said unit to uppermost position upon reversal of the latter.

4. A device for frying food in a culinary receptacle and comprising a foraminous open-top basket and cover forming a unit to fit within said receptacle and extend to adjacent its top, and a handle projecting laterally of said unit and connected thereto to be slidable vertically of the same whereby said handle may be used to reverse the unit for re-insertion into said receptacle and may be in topmost position to overlie the top edge of said receptacle at any such placement of said unit.

5. A device for frying food, comprising a wire mesh open top basket and cover to form an enclosure unit to be reversibly positioned within a culinary receptacle and extend to adjacent the top edge of the latter, and a carrying handle projecting laterally from said basket and bodily movable to adjacent either top or bottom of the latter to overlie the top edge of said receptacle when the unit is within the receptacle.

6. A culinary device for frying foods, comprising a basket having side and bottom walls and open across the top, and a basket cover movably connected to the basket to detachably close the same, said basket and cover being of wire mesh and forming a food-receiving unit to be reversibly and removably supported within a fry utensil and extend to substantially the top edge of the latter, and a handle carried by said basket for reversing the unit for re-insertion into said utensil, said handle projecting laterally and being vertically slidably connected to said basket so as to overhang the top edge of said utensil upon either reversed position of said unit.

HAZEL L. THIELE.